Dec. 22, 1931. G. M. FENN 1,837,421

COASTER SLED

Filed Dec. 19, 1928

George M. Fenn
Inventor
By C. A. Snow & Co.
Attorneys.

UNITED STATES PATENT OFFICE

GEORGE M. FENN, OF CHARLOTTE, MICHIGAN, ASSIGNOR, BY MESNE ASSIGNMENTS, TO SEYMOUR MANUFACTURING COMPANY, INC., OF SEYMOUR, INDIANA

COASTER SLED

Application filed December 19, 1928. Serial No. 327,024.

One object of this invention is to provide novel means for steering a sled, the steering mechanism having no direct connection with the knees or braces of the sled, the rear portions of the runners of the sled being held securely in parallel relation, and the lateral flexing of the runners, in steering, being confined to the forward portions of the runners.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shown in bottom plan, a sled constructed in accordance with the invention;

Figure 1:
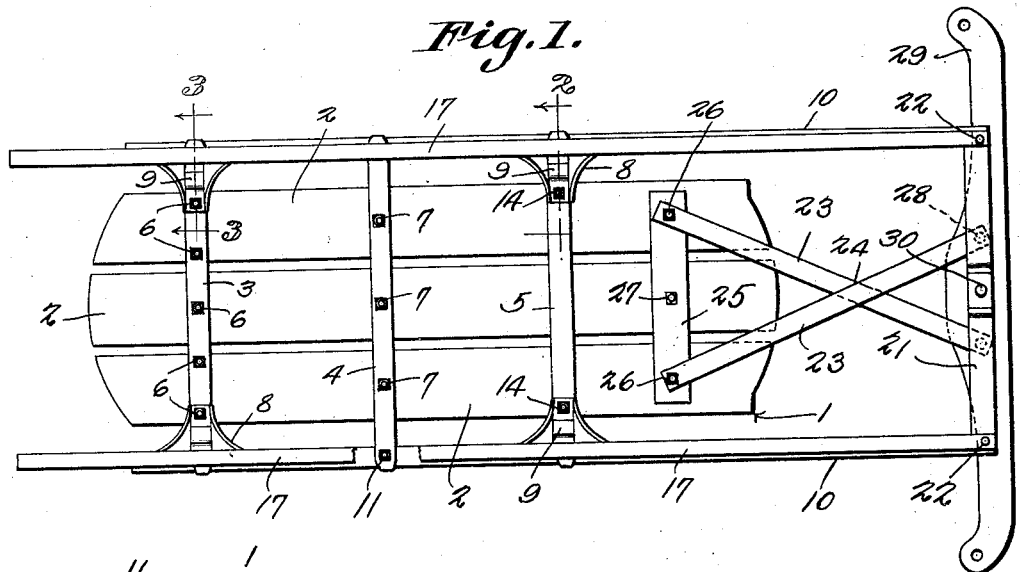

In carrying out the invention, there is provided a platform 1 comprising strips 2. A rear cross bar 3 is provided, the numeral 4 marks an intermediate cross bar, and the front cross bar is shown at 5. Bolts 6 connect the strips 2 with the rear cross bar 3, and bolts 7 connect the strips 2 with the intermediate cross bar 4. The strips 2 are not connected to the front cross bar 5, and, consequently the platform 1 can slide on the front cross bar 5.

Figure 2:
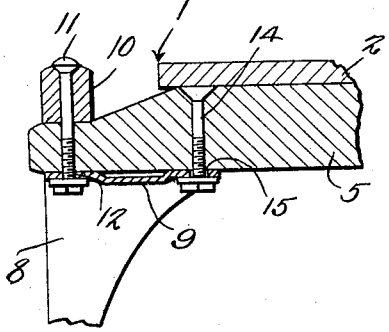
Figure 2 is a section on the line 2—2 of Figure 1.
Figure 3:
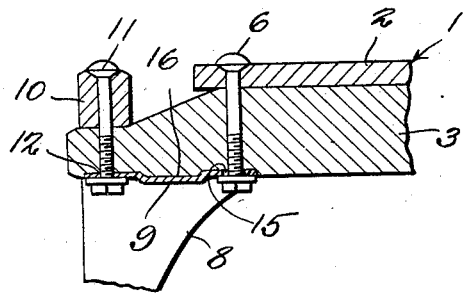
Figure 3 is a section on the line 3—3 of Figure 1.
Figure 4:
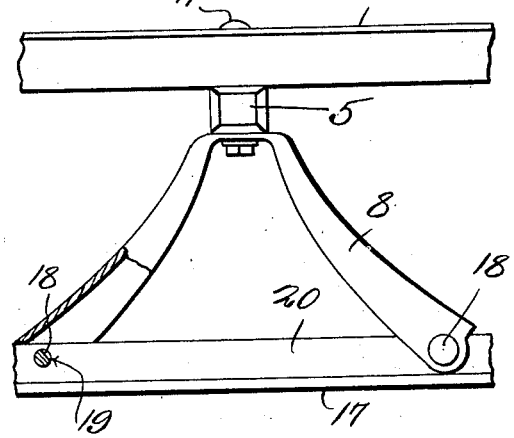
Figure 4 is a side elevation wherein parts are broken away.

Knees 8 are provided, and in the upper portions of the knees there are shallow recesses 9. Side rails 10 are connected to the ends of the cross bars 5, 4, and 3, by bolts 11. The bolts 11 pass downwardly through the upper portions of the knees 8, as shown in Figures 3 and 2. The openings 12 in the knees which receive the securing elements 11, are of the same diameter as the securing elements. The rear knees are held in place, additionally, on the bar 3, by the outermost bolts 6. The platform 1 is not connected to the forward cross bar 5, and, therefore, recourse is had to bolts 14, as a securing means for the forward knees, the platform 1 covering the heads of the bolts 14, as shown in Figure 2. The openings 15 in the knees 8, which receive the bolts 14 of Figure 2, and the bolts 6 of Figure 3, are a little larger in diameter than the bolts 14 and the bolts 6. The reason for this is in order that the forward knees may have a slight movement with the bolts 11 as centers, in steering. It should be noted, however, that this operation takes place only in connection with the forward knees shown in Figure 2.

In connection with the rear knees, shown in Figure 3, the bolts 11 and 6 are drawn up so tightly that the constituent wood of the cross bar 3 will be embedded, as shown at 16, in the recesses 9 of the rear knees. The rear knees 8, therefore, are absolutely rigid on the rear cross bar 3, and the only reason that the enlarged openings 15 are shown in Figure 3 is because one form of knee is used throughout the entire sled. The enlarged openings 15 are absolutely without function in Figure 3. The knees 8 are connected to the runners 17, in a way which will be described hereinafter, but it may properly be stated at this point, that because the rear knees 8 are rigidly secured on the rear bar 3, the rear portions of the runners 17 do not flex laterally, in the steering operation, the end portions of the runners remaining in parallelism all the time. The lateral bending of the runners, in steering, is confined to the forward portions of the runners, and terminates at a point between the bar 5 and the bar 4. To the rear of the bar 4, the runners 17 maintain a rigid and inflexible parallelism.

The lower ends of the knees 8 are connected by securing devices 18, such as rivets, to the upright flanges 20 of the runners 17, although the knees may be welded to the runners, if desired. The runners preferably are of inverted T-shape in cross section. The holes 19 in the flanges 20 of the runners, which receive the securing devices 18, are of the same diameter as the securing devices.

A head bar 21, which may be a strip of metal, is attached by securing elements 22 to the upturned forward ends of the runners 17 and to the forward ends of the side rails 10. In order to secure best results, the rails 10 should be extended forwardly in one piece and connected directly to the upturned ends of the runners 17 and to the head bar 21.

Links 23 are provided, and are crossed upon each other, as shown at 24. A cleat 25 is attached by securing elements 26 and 27 to the strips 2 of the platform 1. The securing elements 26 serve as pivotal mountings for the rear ends of the links 23, the forward ends of the links being pivoted at 28 to a transverse steering member 29 that is fulcrumed intermediate its ends at 30 on the head bar 21.

In practical operation, when the rigid steering member 29 is swung on its fulcrum 30, the links 23 will impart a lateral swinging movement to the forward ends of the runners 17, in a horizontal direction, to bring about the steering operation, in a way well understood by those skilled in the art, the rear portions of the runners 17 remaining rigidly in parallel relation, because the rearmost knees 8 are rigidly and fixedly held upon the bar 3, as shown at 9—16, by the action of the bolts 11 and 6 of Figure 3.

What is claimed is:—

1. A sled comprising a platform, a rear cross bar rigidly secured to the platform, rear knees rigidly secured to the rear cross bar, a forward cross bar on which the platform slides, forward knees yieldably connected to the forward cross bar, a head bar, side rails secured to the cross bars and extended in a single length to the head bar and secured to the head bar, runners secured to the head bar and to the knees, the rear portions of the runners being held by the rear knees in rigid and inflexible parallelism, a transverse steering member fulcrumed intermediate its ends on the head bar, a cleat secured to the platform in spaced relation to the forward knees, crossed links, means for pivotally connecting the rear ends of the links to the said cleat, independently of the forward knees and in spaced relation to the place where the links cross, and means for pivotally connecting the forward ends of the links to the steering member on opposite sides of its fulcrum.

2. A sled comprising a platform, a rear cross bar rigidly secured to the platform, rear knees rigidly secured to the rear cross bar, a forward cross bar on which the platform slides, forward knees yieldably connected to the forward cross bar, a head bar, side rails secured to the cross bars and extended in a single length to the head bar and secured to the head bar, runners secured to the head bar and to the knees, the rear portions of the runners being held by the rear knees in rigid and inflexible parallelism, a transverse steering member fulcrumed intermediate its ends on the head bar, crossed links, means for mounting the rear ends of the links pivotally on the platform independently of the forward knees and in spaced relation to the place where the links cross, and means for connecting the forward ends of the links pivotally with the steering member.

3. A sled comprising a platform, runners, means for securing the rear ends of the runners to the platform in rigid and inflexible parallelism, the forward ends of the runners being laterally flexible, a head bar connecting the forward ends of the runners, a steering member fulcrumed on the head bar, crossed links, means for pivotally connecting the forward ends of the links with the steering member in spaced relation to the place where the links cross, and means for mounting the rear ends of the links pivotally on the platform in spaced relation to the place where the links cross.

4. A sled comprising a platform, forward and rear knees engaging the platform and having recesses, runners connected to the knees, forward securing devices connecting the forward knees with the platform, and rear securing devices connecting the rear knees with the platform, the forward and rear knees being interchangeable duplicates and having openings through which the securing devices pass, the openings being independent of the recesses, the openings being of greater area than the cross section of the securing devices, the rear securing devices being set so tightly as to cause the rear knees to distort the constituent material of the platform into the recesses of the rear knees and hold the rear knees rigidly upon the platform, with the rear portions of the runners in rigid and inflexible parallelism, the forward securing devices being set loosely enough so that the platform is not distorted into the recesses of the forward knees, whereby the forward knees and the forward portions of the runner can be flexed laterally to bring about a steering of the sled.

In testimony that I claim the foregoing as my own, I have hereto affixed my signature.

GEORGE M. FENN.